(12) United States Patent
Takeuchi et al.

(10) Patent No.: US 6,272,901 B1
(45) Date of Patent: Aug. 14, 2001

(54) DETECTING APPARATUS CAPABLE OF DETECTING MAGNITUDE OF SHOCK AND PORTABLE ELECTRONIC APPLIANCE WITH THE SAME

(75) Inventors: Kazuhiro Takeuchi; Mitsuru Kuroda, both of Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/206,542

(22) Filed: Dec. 7, 1998

(30) Foreign Application Priority Data

Dec. 26, 1997 (JP) .................................................... 9-359943

(51) Int. Cl.[7] .................................................. G01M 7/00
(52) U.S. Cl. ............................................................. 73/12.01
(58) Field of Search .............................. 73/12.01, 12.04, 73/12.06, 12.09, 12.13; 361/679, 680

(56) References Cited

U.S. PATENT DOCUMENTS 4,856,318 * 8/1989 Hogan et al. ......................... 73/12.13
5,844,772 * 12/1998 Lee et al. ............................. 361/683

FOREIGN PATENT DOCUMENTS

| | | |
|---|---|---|
| 53-63266 | 5/1978 | (JP) . |
| 56-148068 | 11/1981 | (JP) . |
| 57-196673 | 12/1982 | (JP) . |
| 59-14063 | 1/1984 | (JP) . |
| 59-171423 | 9/1984 | (JP) . |
| 61-140838 | 6/1986 | (JP) . |
| 62-36561 | 2/1987 | (JP) . |
| 63-53440 | 3/1988 | (JP) . |
| 63-111666 | 7/1988 | (JP) . |
| 63-266357 | 11/1988 | (JP) . |
| 2-141633 | 5/1990 | (JP) . |
| 4-152268 | 5/1992 | (JP) . |
| 4-191636 | 7/1992 | (JP) . |
| 7-55606 | 3/1995 | (JP) . |
| 7-130295 | 5/1995 | (JP) . |
| 8-43425 | 2/1996 | (JP) . |

* cited by examiner

*Primary Examiner*—Max Noori
(74) *Attorney, Agent, or Firm*—Scully, Scott, Murphy & Presser

(57) ABSTRACT

In a portable electronic appliance, it includes a housing and a detecting apparatus. The detecting apparatus includes a shock detecting portion and a fixing portion. The shock detecting portion has at least one shock sensing portion which is damaged or deformed due to a shock stronger than or equal to a pre-selected strength. The fixing portion fixes the shock detecting portion to an inside of a housing of an electronic appliance.

6 Claims, 7 Drawing Sheets

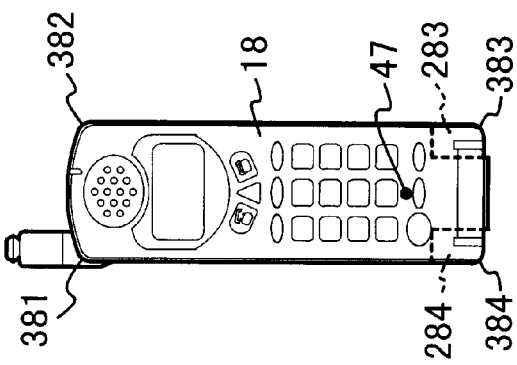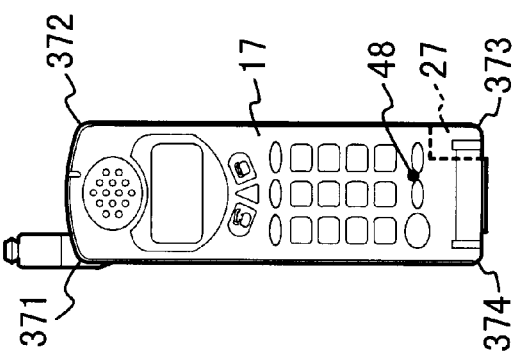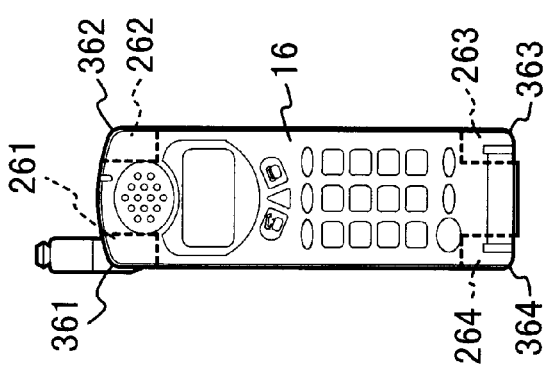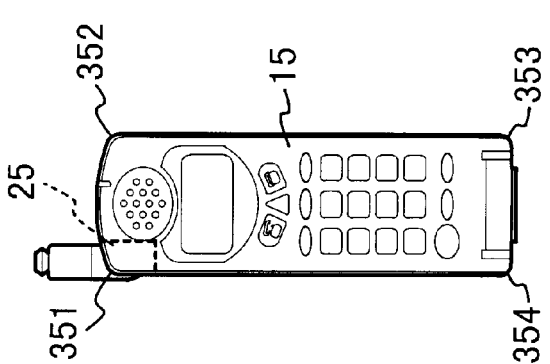

DETECTING APPARATUS CAPABLE OF DETECTING MAGNITUDE OF SHOCK AND PORTABLE ELECTRONIC APPLIANCE WITH THE SAME

BACKGROUND OF THE INVENTION

1. Field of the Invention

The present invention generally relates to a detecting apparatus and a portable electronic appliance, and more specifically, related to a detecting apparatus for detecting strength of shocks and stress applied to electronic appliances in the past, and also to a portable electronic appliance mounted with the detecting apparatus.

2. Description of the Related Art

Very recently, compact and portable electronic appliances such as portable telephones, portable computers, and portable information communication terminals are commercially available. These electronic appliances are used in portable use. As a consequence, these portable electronic appliances easily receive shocks and stress while users mistakenly drop these electronic appliances. However, since these portable electronic appliances are preferably made compact and light weighted due to their portable use, very hard covers may not be mounted on these portable electronic appliances. As a result, when strong shocks and excessive stress would be applied to these electronic appliances, there are some risks that these electronic appliances are brought into malfunction.

Conventionally, in case that malfunction of a portable electronic appliance happens to occur, generally speaking, a user requests a manufacturer through a sales shop to repair this failure electronic appliance.

In portable electronic appliances, shocks occurred when users drop these portable electronic appliances would constitute major factors of malfunction. However, no engineer could recognize the strengths of the shocks which have actually been applied to the failure portable electronic appliances. As a consequence, it is practically difficult to predict the malfunction reason of this failure electronic appliance, or to clarify this malfunction reason. Conversely, no engineer could grasp the strength of shocks which are applied to a portable electronic appliance and by which a portable electronic appliance is brought into malfunction, or failure operation.

Japanese Laid Open Patent Application (JP-A-Showa 56-148068) discloses "WEARINESS EVALUATION APPARATUS OF SEMICONDUCTOR DEVICE". This conventional technique is related to the thermal weariness of the soldering junction portion within the semiconductor device package. This weariness evaluation apparatus can correctly measure and also evaluate the thermal weariness in response to elapsed time. However, this patent technique cannot solve the above-explained difficulties.

Also, Japanese Laid Open Patent Application (JP-A-Showa 61-140838) discloses "METHOD OF DIAGNOSING STRUCTURAL MEMBER". This conventional technique is related to the method capable of correctly judging the remaining lifetime of the mechanical structural member. However, this inventive idea cannot solve the above-described difficulties.

Japanese Laid Open Patent Application (JP-A-Showa 63-53440) describes "MATERIAL EXAMINATING APPARATUS". This conventional technique is related to the material examining apparatus of examining the structural member having the non-uniform material characteristic, or of examining the structural member which receives the not-uniform load. However, this inventive idea cannot solve the above-explained difficulties.

Japanese Laid Open Patent Application (JP-A-Heisei 4-191636) discloses "MEASURING SYSTEM OF PROPAGETING CRACKS". This conventional technique is related to a measuring system easily measuring a propagating velocity on cracks produced on metal materials, and this propagating velocity is applied to the analysis for progressing cracks on metal materials. However, this inventive idea cannot solve the above-explained difficulties.

Japanese Laid Open Patent Application (JP-A-Heisei 7-130295) discloses "RECYCLABLE STRUCTURAL ELEMENT HAVING DATA STORAGE APPARATUS FOR STORING INFORMATION USED TO EXAMINE STRUCTURAL ELEMENT, AND PRODUCT HAVING SAME ELEMENT". This conventional technique is related to the recyclable structural element, and also to the apparatus for examining the product having this recyclable structural element, and further to this product itself. However, this inventive idea cannot solve the above-explained difficulties.

SUMMARY OF THE INVENTION

The present invention has been made to solve the above-explained problems.

Therefore, an object of the present invention is to provide a detecting apparatus for detecting strength of shocks which have been applied in the past to an electronic appliance.

Another object of the present invention is to provide a detecting apparatus in which it can be checked whether or not a major factor of an operation failure occurred in the electronic appliance is caused by the applied shocks.

Still another object of the present invention is to provide a portable electronic appliance mounted with the detecting apparatus.

Furthermore, yet still another object of the present invention is to provide a detecting apparatus for investigating that the electronic appliance is brought into malfunction by the strength of shocks which are applied to an electronic appliance.

Also, it is an object to provide a portable electronic appliance mounted with the detecting apparatus.

In order to achieve an aspect of the present invention, a detecting apparatus includes a shock detecting portion having at least one shock sensing portion and a fixing portion for fixing the shock detecting portion to an inside of a housing of an electronic appliance. Here, the shock sensing portion is damaged due to a shock stronger than or equal to a pre-selected strength.

The fixing portion has an adhesive property.

The shock detecting portion includes a plurality of the shock sensing portions and each of the plurality of shock sensing portions is damaged due to the shock.

The shock sensing portion is made of material selected from the group consisting of glass, a metal thin film, a material having a low anti-shock characteristic, a composite material manufactured by distributing short fibers into brittle resin, and an electronic component highly sensible to a shock.

In order to achieve another aspect of the present invention, a detecting apparatus includes a shock detecting portion having at least one shock sensing portion and a fixing portion for fixing the shock detecting portion to an inside of a housing of an electronic appliance. Here, the shock sensing portion is deformed due to a shock having stronger than, or equal to a pre-selected strength. The fixing portion has an adhesive property.

The shock sensing portion has a deformation amount in response to an applied shock strength.

The shock detecting portion includes a plurality of shock sensing portions and each of the shock sensing portions has different deformation amounts with respect to a predetermined shock strength.

In order to achieve still another aspect of the present invention, A portable electronic appliance includes a housing and a detecting apparatus fixed to an inside of the housing. Here, the detecting apparatus includes a shock detecting portion having at least one shock sensing portion for sensing a shock stronger than or equal to a pre-selected strength.

The portable electronic appliance includes at least one corner portion and the detecting apparatus is fixed to the at least one corner portion in or near of a gravity center.

The portable electronic appliance includes a plurality of corner portions and all of the corner portions are provided with the detecting apparatus.

The shock sensing portion is damaged due to the shock having higher than or equal to the pre-selected strength.

The shock detecting portion includes a plurality of shock sensing portions and the plurality of shock sensing portions are damaged due to the shock having different strengths, respectively.

The shock sensing portion is deformed due to the shock stronger than or equal to a preselected strength.

The shock detecting portion includes a plurality of shock sensing portions and each of the shock sensing portions has different deformation amounts with respect to a predetermined shock strength.

The portable electronic appliance corresponds to any one of a portable computer, a portable information communication terminal, and a portable telephone.

BRIEF DESCRIPTION OF THE DRAWINGS

FIG. 5 illustratively indicates a portable electronic appliance according to a second embodiment of the present invention;

FIG. 6 illustratively shows a first modification of the portable electronic appliance according to the second embodiment of the present invention;

FIG. 7 illustratively shows a second modification of the portable electronic appliance according to the second embodiment of the present invention;

FIG. 8 illustratively shows a third modification of the portable electronic appliance according to the second embodiment of the present invention;

FIG. 12A is a perspective view of the fourth detecting apparatus, and FIG. 12B is a sectional view of the fourth detecting apparatus, taken along a line A–A' of FIG. 12A;

DESCRIPTION OF THE PREFERRED EMBODIMENTS

Referring now to drawings, various preferred embodiments of the present invention will be described in detail.

Figure 1:
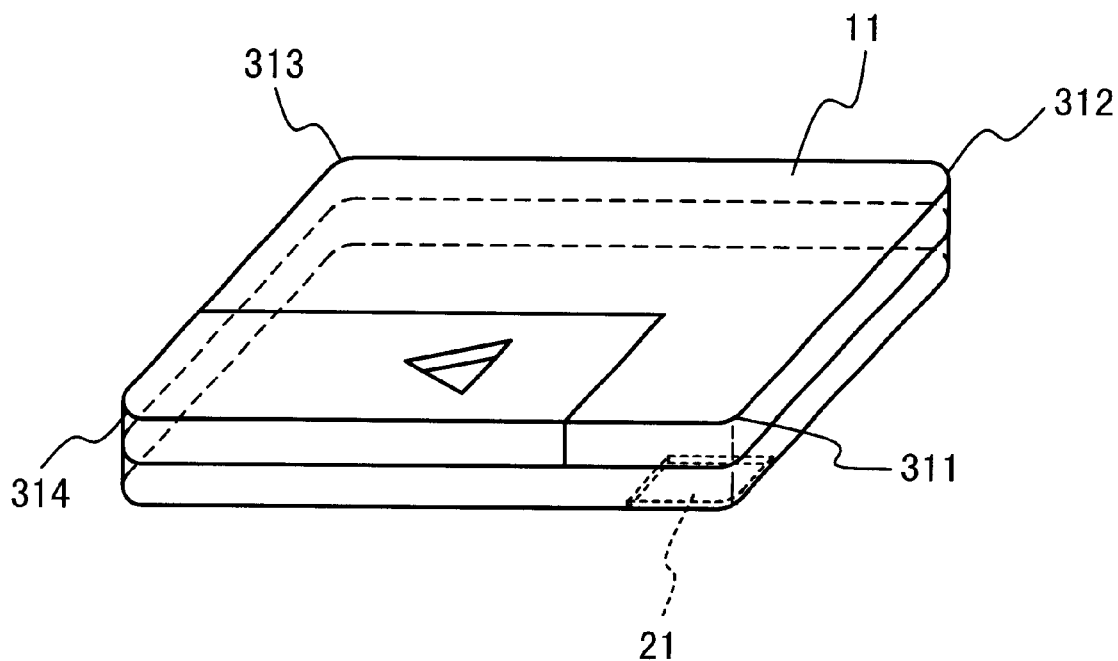
FIG. 1 is a perspective view of a portable electronic appliance according to a first embodiment of the present invention.

FIG. 1 is a perspective view showing a portable electronic appliance according to a first embodiment of the present invention. As indicated in this drawing, a detecting apparatus 21 is mounted inside a housing 11 of a portable electronic appliance. The detecting apparatus 21 detects shock and stress historical data (namely, strength of shocks and stress have been applied to the detecting apparatus 21 in the past). In this first embodiment, the detecting apparatus 21 is mounted in or near one corner portion within the housing 11 of the portable electronic appliance. The portable electronic appliance is a portable computer or a portable information communication terminal known as PDA (personal digital assistants).

The shock and stress historical data detecting apparatus 21 has a shock detecting portion. The shock detecting portion contains a shock sensing portion made of a brittle material such as glass and a metal thin film. The shock sensing portion has a threshold value on a shock strength, and when a shock stronger than or equal to the threshold value is applied to the shock sensing portion, a crack is produced on the shock sensing portion. When a shock stronger than the pre-determined value is applied to the detecting apparatus 21, a crack such as a fissure, a cleft, and a cleavage is produced in the shock sensing portion of the detecting apparatus 21.

Also, the detecting apparatus 21 is attached not on a surface of the housing 11, but to the inside of the housing 11. The shock sensing portion cannot be damaged by cracks made on the surface of the housing 11, but may be damaged only when the hitting shocks are received by the portable electronic appliance.

When a shock is given to the portable electronic appliance mounted with the detecting apparatus 21 and the strength of this shock exceeds the threshold value, a crack is produced in the shock sensing portion provided within the detecting apparatus 21 mounted on the portable electronic appliance. When a user drops the portable electronic appliance or hits the portable electronic appliance on a certain item, This shock is applied to the portable electronic appliance.

When an operation failure happens to occur in the damaged portable electronic appliance and therefore the user requests to repair the damaged portable electronic appliance, a repair engineer makes a check whether or not cracks are produced in the shock sensing portion in the detecting apparatus 21 mounted on the portable electronic appliance. As a result, the repair engineer may consider that the operation failure is caused by the strength of the shock given to the portable electronic appliance.

First, the repair engineer disassembles the portable electronic appliance under malfunction so as to investigate the detecting apparatus 21 provided inside the housing 11. As a result of this investigation, if the crack is produced in the shock sensing portion in the detecting apparatus 21, the repair engineer can recognize that a shock strength stronger than the threshold value was applied to the shock sensing portion of the portable electronic appliance in the past. Under such a circumstance, there are some possibilities that the reason why the portable electronic appliance is under malfunction is caused by the shock strength stronger than the threshold value given to the portable electronic appliance. As a consequence, the repair engineer can repair the failed portable electronic appliance, taking account of the malfunction factor caused by the shock.

As a result of the investigation by the detecting apparatus 21, when no crack is produced in the shock sensing portion of the detecting apparatus 21, the repair engineer can recognize that a shock strength stronger than, or equal to the above-described threshold value was not applied to the shock sensing portion in the past. Under such a circumstance, the repair engineer may perform the repair work with having an assumption that the operation failure factor of the portable electronic appliance is caused by any reasons other than the shock.

As a consequence, the repair engineer may readily and quickly select the major reason for causing the operation failure by confirming whether or not the shock sensing portion employed in the detecting apparatus 21 is damaged. The shock detecting apparatus 21 is fixed within the housing 11 of the portable electronic appliance with the failed operation. Furthermore, the repair engineer may execute the repair work while predicting whether or not the apparatus malfunction is caused by the shock. As a result, the repair work can be effectively carried out, and furthermore the repair time can be shortened. It is preferable to replace the shock detecting apparatus 21 by a new detecting apparatus after the malfunction of the portable electronic appliance has been repaired in a case that either the crack or the damage is made in the shock sensing portion in the detecting apparatus 21.

As previously indicated, the portable electronic appliance according to the first embodiment of the present invention is featured as follows. While the detecting apparatus 21 has been mounted inside the housing 11, the portable electronic appliance is sold. When the repair requirement is made, the detecting apparatus 21 is used to detect the strength of the shock applied to the failed portable electronic appliance, and upon this detection result, the repair engineer can repair the failure portable electronic appliance.

In this embodiment, the material and the film thickness of the shock sensing portion provided in the detecting apparatus 21 are selected in a manner that the threshold value of the shock sensing portion may be essentially made coincident with the shock strength for causing the failed operation of the portable electronic appliance. As a result, the repair engineer can visually recognize whether or not the shock sensing portion is damaged by the shock for damaging the portable electronic appliance. Alternatively, a plurality of shock detecting apparatuses 21 may be mounted within the housing 11 to detect various strengths of shocks which have been applied to various portions within the housing 11.

On the other hand, in case that an antishock characteristic of a portable electronic appliance is unclear, this anti-shock characteristic may be defined by the portable electronic appliance according to the first embodiment of the present invention. Concretely speaking, the portable electronic appliances, comparisons are checked whether or not the failed operations occur, and also whether or not the shock sensing portions in the detecting apparatus 21 mounted inside the housing 11 of the respective portable electronic appliances are damaged. When a plurality of shock sensing portions having different threshold values are employed in the detecting apparatus 21, both an upper limit value and a lower limit value of strengths of the shocks applied to the detecting apparatus 21 may be grasped. As a consequence, the unclear anti-shock characteristic of the portable electronic appliance may be more precisely cleared.

Alternatively, a shock sensing portion in the detecting apparatus 21 may be made of a material having a plastic deformation characteristic. In this alternative case, when a shock strength higher than or equal to a pre-selected value is applied to the detecting apparatus 21, the shock sensing portion in the detecting apparatus 21 is deformed. The shock sensing portion has a threshold value. The shock sensing portion is deformed by a shock strength stronger than or equal to the threshold value. Also, the deformation amount of the shock sensing portion is defined in response to the shock strength. As a consequence, a similar effect to the above case may be achieved by confirming the deformation amount of the shock sensing portion, or by checking the condition of deforming the shock sensing portion. The material of the shock sensing portion is applied to any metals of ductility, or any gel-conditioned substance.

Figure 2:
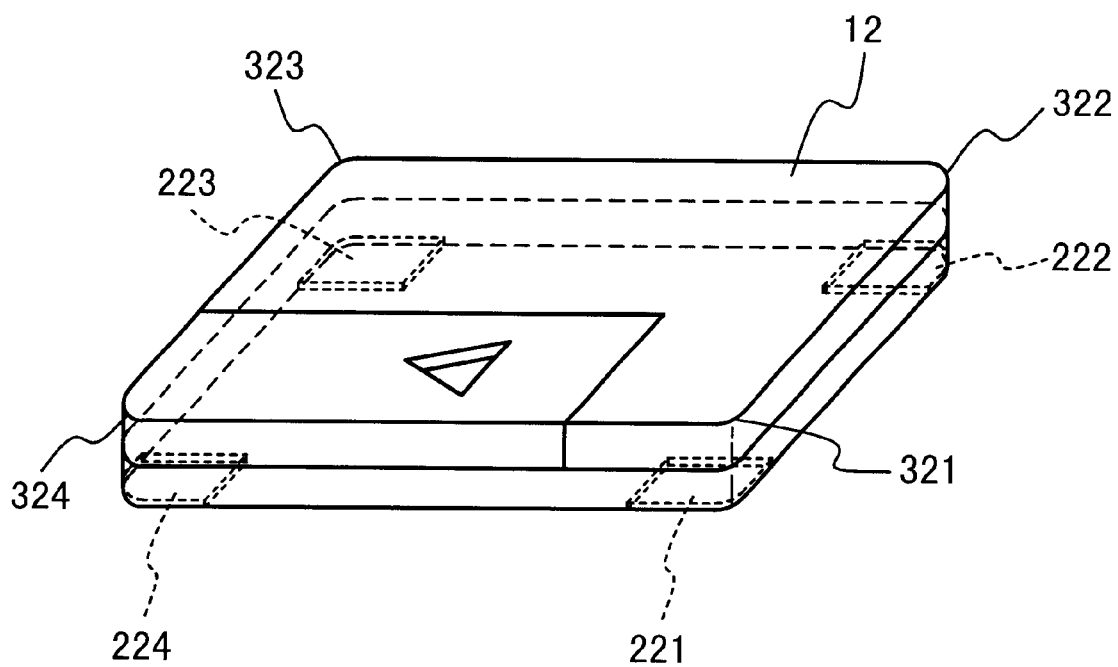
FIG. 2 illustratively shows a first modification of the portable electronic appliance according to the first embodiment of the present invention.

FIG. 2 illustratively shows a first modification belonging to the portable electronic appliance according to the first embodiment of the present invention. A plurality of detecting apparatuses 221, 222, 223, and 224 for detecting shock and stress historical data are mounted inside a housing 12 of the portable electronic appliance. In this first modification, four sets of the detecting apparatuses 221, 222, 223, and 224 are mounted on all of four corner portions 321, 322, 323, 324 within the housing 12 of the portable electronic appliance. Each of the detecting apparatuses 221, 222, 223 and 224 is the same as the detecting apparatus 21 mounted in the portable electronic appliance according to the first embodiment of the present invention.

Figure 3:
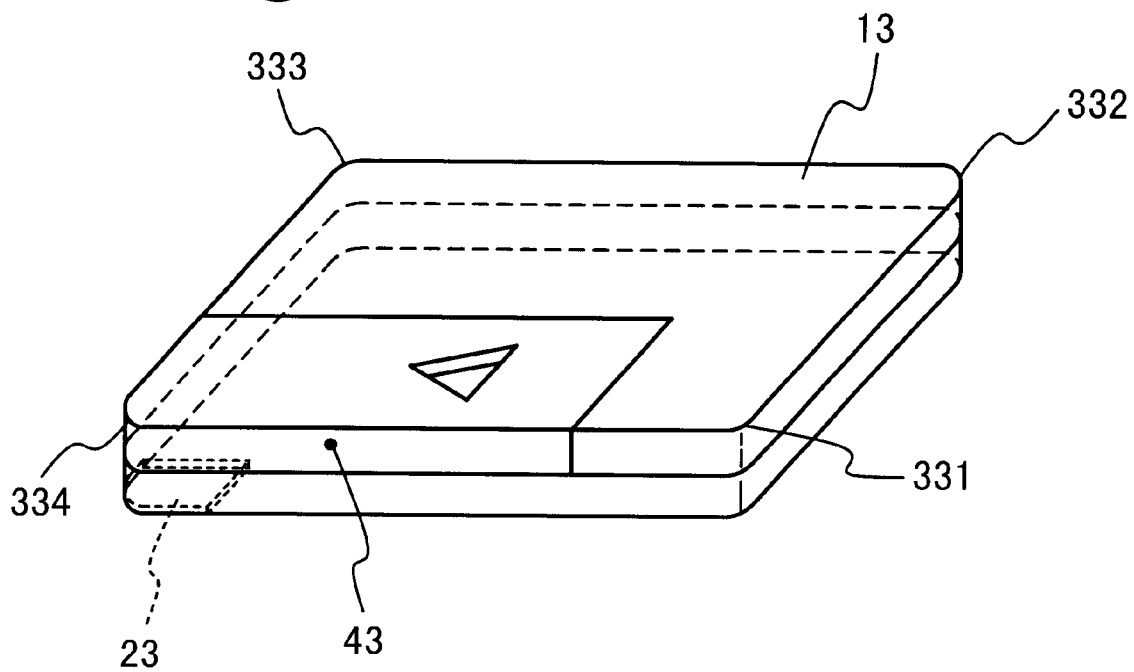
FIG. 3 illustratively shows a second modification of the portable electronic appliance according to the first embodiment of the present invention.

FIG. 3 illustratively shows a second modification belonging to the portable electronic appliance according to the first embodiment of the present invention. A detecting apparatus 23 for detecting shock and stress historical data is mounted inside a housing 13 of the portable electronic appliance. In this second modification, the detecting apparatus 23 is provided at one corner portion 334 in or neat a center of gravity 43 of the portable electronic appliance. The detecting apparatus 23 employed in the second modification is the same as the detecting apparatus 21 in the first embodiment of the present invention.

Figure 4:
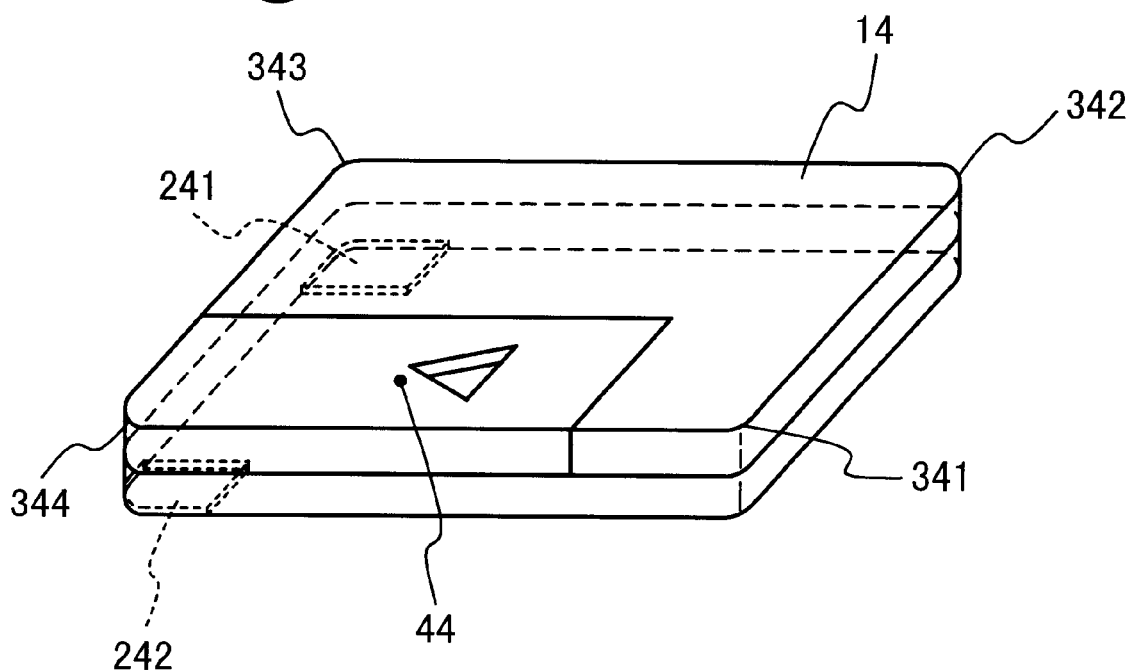
FIG. 4 illustratively shows a third modification of the portable electronic appliance according to the first embodiment of the present invention.

FIG. 4 illustratively shows a third modification belonging to the portable electronic appliance according to the first embodiment of the present invention. A plurality of detecting apparatuses 241 and 242 for detecting shock and stress historical data are mounted inside a housing 14 of the portable electronic appliance. In the third modification, the detecting apparatuses 241 and 242 are provided at a plurality of corner portions 343 and 344 in or near a center of gravity 44 of the portable electronic appliance. The third modification has a different structure that the detecting apparatuses 241 and 242 are mounted at the plural corner portions 343 and 344, as compared with the structure of the second modification. In the portable electronic appliance, a distance between one corner portion 343 and the gravity center 44 is essentially equal to another distance between the other corner portion 344 and the gravity center 44. Each of the detecting apparatuses 241 and 242 employed in the second modification is the same as the detecting apparatus 21 in the first embodiment of the present invention.

FIG. 5 illustratively indicates a portable electronic appliance according to a second embodiment of the present invention. In the second embodiment, a detecting apparatus 25 for detecting shock and stress historical data is mounted within a housing 15 of the portable electronic appliance in a manner that the detecting apparatus 25 is mounted at a corner portion 351 inside the housing 15. In the second embodiment, the portable electronic appliance is a portable telephone. The detecting apparatus 25 mounted in the second embodiment is the same as the detecting apparatus 21 in the first embodiment.

FIG. 6 illustratively shows a first modification belonging to the portable electronic appliance according to the second embodiment of the present invention. A plurality of detecting apparatuses 261, 262, 263, and 264 for detecting shock and stress historical data are mounted inside a housing 16 of the portable electronic appliance. In the first modification, four sets of the detecting apparatuses 261, 262, 263 and 264 are mounted on all of four corner portions 361, 362, 363, 364 within the housing 16 of the portable electronic appliance. Each of these detecting apparatuses 361, 362, 363, and 364 is the same as the detecting apparatus 21 in the portable electronic appliance according to the first embodiment of the present invention.

FIG. 7 illustratively shows a second modification belonging to the portable electronic appliance according to the second embodiment of the present invention. A detecting apparatus 27 for detecting shock and stress historical data is mounted inside a housing 17 of the portable electronic appliance. In the second modification, the detecting apparatus 27 is provided at one corner portion 373 in or near a center of gravity 47 of the portable electronic appliance. The detecting apparatus 27 in the second modification is the same as the detecting apparatus 21 in the portable electronic appliance according to the first embodiment of the present invention.

FIG. 8 illustratively shows a third modification belonging to the portable electronic appliance according to the second embodiment of the present invention. A plurality of detecting apparatuses 281 and 282 for detecting shock and stress historical data are mounted inside a housing 18 of the portable electronic appliance. In the third modification, the detecting apparatuses 281 and 282 are provided at a plurality of corner portions 373 and 374 in or near a center of gravity 48 of the portable electronic appliance. The third modification has a different structure that the detecting apparatuses 281 and 282 are mounted at the plural corner portions 373 and 374, as compared with the structure of the second modification of the second embodiment. In the portable electronic appliance, a distance between one corner portion 373 and the gravity center 48 is essentially equal to a distance between the other corner portion 374 and the gravity center 48. Each of the detecting apparatuses 281 and 282 in the third modification is the same as the detecting apparatus 21 in the portable electronic appliance according to the first embodiment of the present invention.

Next, various detecting apparatuses according to the present invention are explained in detail with reference to drawings.

Figure 9:
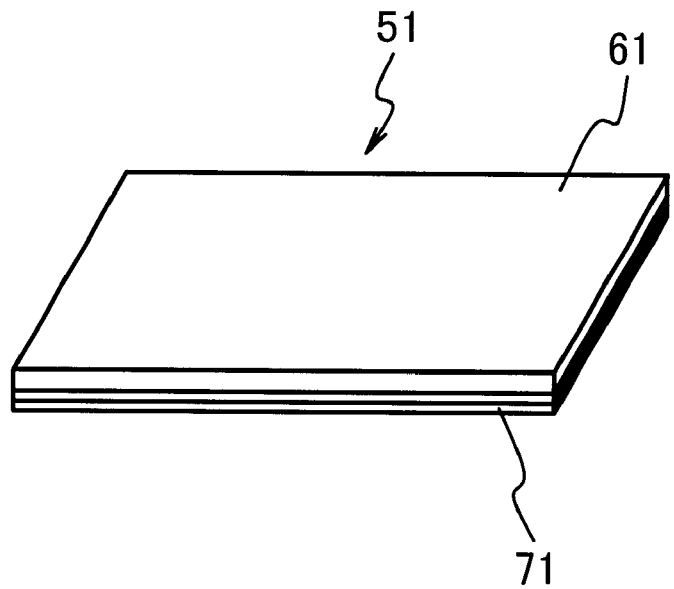
FIG. 9 is a perspective view of a structure of a detecting apparatus according to a first embodiment of the present invention.

FIG. 9 is a perspective view for showing a structure of a detecting apparatus 51 according to a first embodiment of the present invention. The first detecting apparatus 51 has a shock sensing portion 61 and an adhesive portion 71. The shock sensing portion 61 is made of a brittle material. When a shock strength stronger than a pre-determined value is applied to the detecting apparatus 51, a crack such as a fissure, a cleft, and a cleavage is produced in the shock sensing portion 61. A threshold value has been previously required for the shock sensing portion 61. The threshold value indicates a shock strength to produce a crack in the shock sensing portion 61. The adhesive portion 71 has an adhesive characteristic and the adhesive portion 71 may fix the detecting apparatus 51 inside a housing of an electronic appliance A material of the shock sensing portion 61 is applied to any one of glass or a metal thin film. Alternatively, the material is applied to a low anti-shock characteristic of a low Izot shock value such as acrylic resin. Furthermore, the shock sensing portion 61 is applied to a composite material made of brittle resin and short fibers distributed into the brittle resin. In addition, the shock sensing portion 61 is applied to an electronic component highly sensible to a shock such as a ceramic filter.

Moreover, when the surface of the shock sensitive portion 61 has an electric conductivity, the damage to the shock sensing portion 61 may be detected by measuring an electric resistance value of the surface of the shock sensing portion 61.

The adhesive portion 71 is applied to any one of a double-sided adhesive tape, an adhesive for sticking together instantaneously, or an elastic adhesive with a high stripping strength.

The above-explained detecting apparatus 51 may be used as each of the detecting apparatuses mounted on the portable electronic appliance according to the first and second embodiments of the present invention shown in FIGS. 1 to 8.

Figure 10:
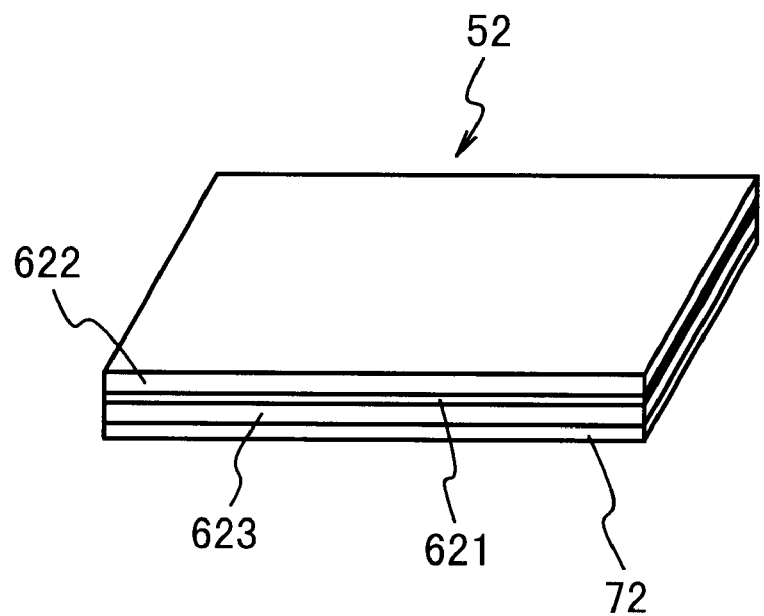
FIG. 10 is a perspective view of a structure of a detecting apparatus according to a second embodiment of the present invention.

FIG. 10 is a perspective view for indicating a structure of a detecting apparatus 52 according to a second embodiment of the present invention.

The second detecting apparatus 52 is composed of a thin film 621, an upper layer 622, lower layer 623, and an adhesive portion 72. The upper layer 622 is separated from the lower layer 623 by a thin film 621. An adhesive portion 72 is provided on a surface of either the upper layer 622 or the lower layer 623.

The thin film 621 has a threshold value. When a shock stronger than or equal to the threshold value is applied to the thin film 621, crack is produced on the thin film 621, or the thin film 621 is destroyed. A material of the thin film 621 is applied to either glass or a metal thin film.

The fluid-like paint having different characteristics from each other is filled into the upper layer 622 and the lower layer 623. The fluid-like paint may have low viscosity. Moreover, color of the fluid-like paint filled into the upper layer 622 is different from the color of the fluid-like paint filled into the lower layer 623.

The adhesive portion 72 is applied to any one of a double-sided adhesive tape, an adhesive for sticking together instantaneously, or an elastic adhesive with a high stripping strength.

Alternatively, the second detecting apparatus 52 may have a structure made of a transparent material such as transparent plastic. The transparent structure may cover the thin film 621, the upper layer 622, and the lower layer 623, to prevent the paint filled into the upper layer 622 and the lower layer 623 from being leaked.

When a shock is applied to the second detecting apparatus 52 and the shock is stronger than or equal to the threshold value of the thin film 621, crack is produced on the thin film 621, or the thin film 621 is destroyed. Consequently, the paint filled into the upper layer 622 is mixed with the paint filled into the lower layer 623 via a portion of the thin film 621 in which the crack is produced or via the destroyed portion of the thin film 621.

The repair engineer can recognize the shock and stress historical data of the detecting apparatus 52 by observing the colors of the detecting apparatus 52.

That is, the shock and stress historical data of the second detecting apparatus 52 can be confirmed by observing the color change in the upper layer 622 and the lower layer 623.

The above-explained detecting apparatus 52 may be used as each of the detecting apparatuses mounted on the portable electronic appliance according to the first and second embodiments of the present invention shown in FIGS. 1 to 8.

Figure 11:
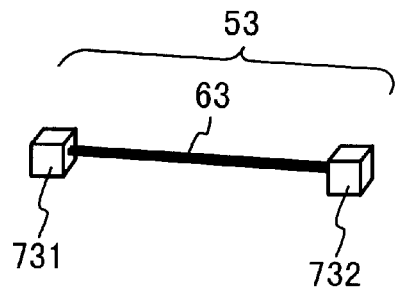
FIG. 11 is a perspective view of a structure of a detecting apparatus according to a third embodiment of the present invention.

FIG. 11 is a perspective view for indicating a structure of a detecting apparatus 53 according to a third embodiment of the present invention.

The third detecting apparatus 53 is constituted by a linear-shaped shock sensing portion 63, both ends of which are fixed by fixing portions 731 and 732.

These fixing portions 731 and 732 are made of a material for fixing the shock sensing portion 63 at any position inside the portable electronic appliance. The fixing portions 731 and 732 have adhesive characteristics and the fixed portions 731 and 732 may fix the third detecting apparatus 53 inside housing of an electronic appliance. Alternatively, each of the fixed portions 731 and 732 may have an adhesive layer.

The material of the adhesive layer is applied to any one of a double-sided adhesive tape, an adhesive for sticking together instantaneously, or an elastic adhesive with a high stripping strength.

The shock sensing portion 63 has a threshold value on a shock strength. When a shock stronger than or equal to the threshold value is applied to the shock sensing portion 63, the shock sensing portion 63 is disconnected. As a consequence, the repair engineer can recognize the shock and stress historical data by confirming whether or not the shock sensing portion 63 is disconnected.

Alternatively, the shock sensing portion 63 may be made from an electric conductive material. In this alternative case, on the measured electric resistance value of the shock sensing portion 63, the repair engineer can confirm whether or not the shock sensing portion 63 is disconnected and further can grasp the shock and stress historical data.

The above-explained detecting apparatus 53 may be used as each of the detecting apparatuses mounted on the portable electronic appliance according to the first and second embodiments of the present invention shown in FIGS. 1 to 8.

Figure 12A:
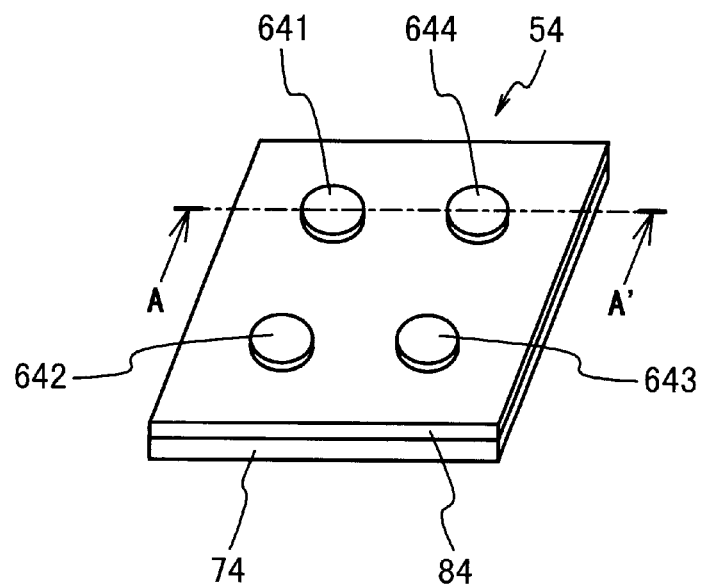
FIGS. 12A and 12B illustratively indicate a detecting apparatus according to a fourth embodiment of the present invention.
Figure 12B:
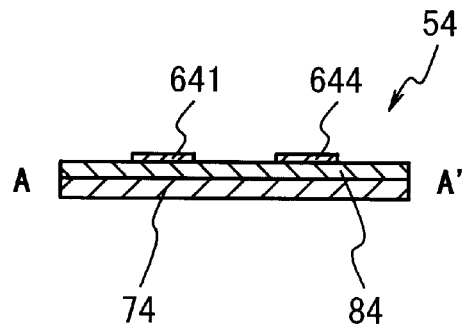

FIGS. 12A and 12B illustratively indicate a detecting apparatus 54 according to a fourth embodiment of the present invention. FIG. 12A is a perspective view of the fourth detecting apparatus 54, and FIG. 12B is a sectional view of the fourth detecting apparatus, taken along a line A–A' of FIG. 12A.

In the fourth detecting apparatus 54, a plurality of shock sensing portions 641, 642, 643 and 644 are provided on a thin film 84 over an adhesive layer 74.

These four shock sensing portions 641, 642, 643 and 644 have threshold values different from each other. When a shock stronger than or equal to a strength is applied to each of these shock sensing portions 641, 642, 643, and 644, a crack is produced in ones of the plurality of shock sensing portions 641, 642, 643 and 644. However the other of the plurality of shock sensing portions 641, 642, 643 and 644 are not damaged. For instance, these four shock sensing portions 641, 642, 643 and 644 may be manufactured of different materials and may have different thicknesses, respectively.

As a result, even when the fourth detecting apparatus 54 receives a shock having the same strength, there are the shock sensing portions in which the cracks are produced and the shock sensing portions in which no crack is produced. Under such a structural feature of the fourth detecting apparatus 54, while previously confirming the threshold values specific to the respective shock sensing portions 641, 642, 643 and 644, the repair engineer can grasp the strength of the applied shock by observing whether or not any cracks are produced in the respective shock sensing portions 641, 642, 643 and 644.

As a consequence, the repair engineer can precisely investigate a failure reason when an operation of an electronic appliance fails, and can correctly detect an anti-shock characteristic of the electronic appliance in a simple manner.

As one example, the following condition will now be considered. That is, it is supposed that cracks are produced in the shock sensing portions 641 and 642, whereas no crack is produced in the shock sensing portions 643 and 644. In this case, the strength of the shock applied to the fourth detecting apparatus 54 is defined as a value higher than or equal to the threshold values of the shock sensing portions 641 and 642. Also the shock strength is defined as the value of lower than, or equal to the threshold values of the remaining shock sensing portions 643 and 644.

Moreover, a plurality of these shock sensing portions 641, 642, 643 and 644 may be classified into a plurality of detecting groups. Each of these detecting groups includes a preselected number of shock sensing portions, the threshold values of which are essentially identical to each other.

The above-explained detecting apparatus 54 may be used as each of the detecting apparatuses mounted on the portable electronic appliance according to the first and second embodiments of the present invention shown in FIGS. 1 to 8.

Figure 13:
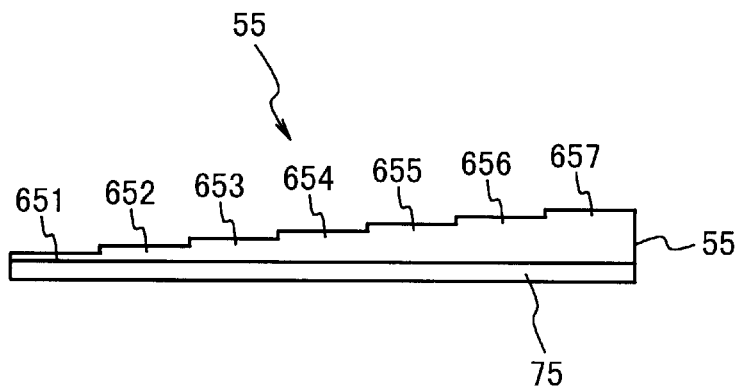
FIG. 13 is a sectional view of a detecting apparatus according to a fifth embodiment of the present invention.

FIG. 13 is a sectional view for indicating a detecting apparatus 55 according to a fifth embodiment of the present invention.

In the firth detecting apparatus 55, a plurality of shock sensing portions 651, 652, 653, 654, 655, 656 and 657 are provided in a stepwise form on an adhesive layer 75. These shock sensing portions have different thicknesses from each other.

These seven shock sensing portions 651, 652, 653, 654, 655, 656 and 657 have threshold values different from each other. When a shock stronger than or equal to a strength is applied to each of these shock sensing portions 651, 652, 653, 654, 655, 656 and 657, cracks are produced in ones of the plurality of shock sensing portions 651, 652, 653, 654, 655, 656 and 657. However the other of the plurality of shock sensing portions 651, 652, 653, 654, 655, 656 and 657 are not damaged.

As a result, even when the fifth detecting apparatus 55 receives a shock having a certain strength, there are the shock sensing portions in which the cracks are produced and the shock sensing portions in which no crack is produced. Under such a structural feature of the fifth detecting apparatus 54, while previously confirming the threshold values specific to the respective shock sensing portions 651, 652, 653, 654, 655, 656 and 657, the repair engineer can grasp the strength of the applied shock by observing whether or not cracks are produced in all of the shock sensing portions 651, 652, 653, 654, 655, 656 and 657.

As a consequence, the repair engineer can precisely investigate a failure reason when an operation of an electronic appliance fails, and can correctly detect an anti-shock characteristic of the electronic appliance in a simple manner.

As one example, the following condition will now be considered. That is, it is supposed that cracks are produced in the shock sensing portions 651, 652, 653 and 654, whereas no crack is produced in the shock sensing portions 655, 656 and 657. In this case, the strength of the shock applied to the fifth detecting apparatus 55 is defined as a value higher than or equal to the threshold values of the shock sensing portions 651, 652, 653 and 654. Also the shock strength is defined as the value of lower than, or equal to the threshold values of the remaining shock sensing portions 655, 656 and 657.

In accordance with the fifth embodiment, since a plurality of shock sensing portions 651, 652, 653, 654, 655, 656 and 657 are provided in the stepwise shape, the repair engineer can recognize the strength of the shock by checking the height of the shock sensing portion which is produced the cracks. For instance, when the cracks are produced in the shock sensing portions of thicknesses, the repair engineer can recognize such a fact that the strength of the applied shock is strong, or high.

As a consequence, the repair engineer can precisely investigate a failure reason when an operation of an electronic appliance fails, and can correctly detect an anti-shock characteristic of the electronic appliance in a simple manner.

The above-explained detecting apparatus 55 may be used as each of the detecting apparatuses mounted on the portable electronic appliance according to the first and second embodiments of the present invention shown in FIGS. 1 to 8.

Figure 14:
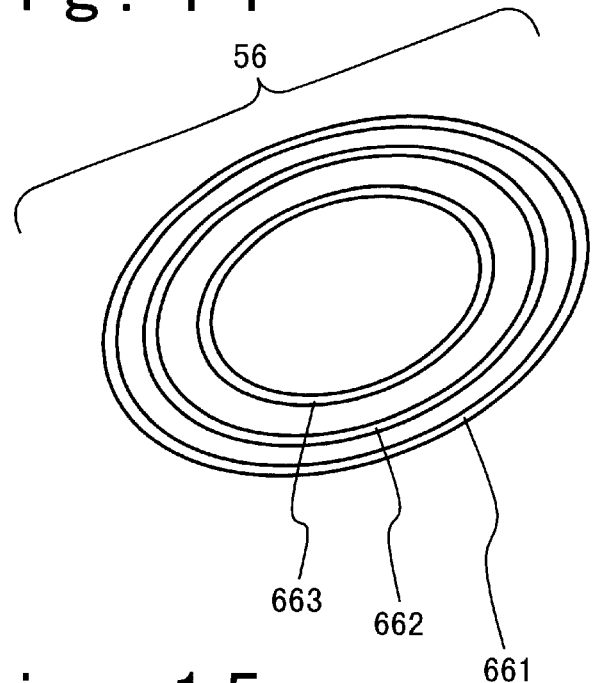
FIG. 14 is a perspective view of a structure of a detecting apparatus according to a sixth embodiment of the present invention.

FIG. 14 is a perspective view for indicating a structure of a detecting apparatus 56 according to a sixth embodiment of the present invention.

The sixth detecting apparatus 56 includes shock sensing portions 661, 662, and 663 made of at least one ring. Either materials or film thicknesses of the respective rings are different from each other, and have different threshold values under which cracks are produced. As a consequence, the repair engineer can recognize a strength of a shock applied to the sixth detecting apparatus 56 by confirming whether or not cracks are produced in the rings.

The sixth detecting apparatus 56 may be manufactured in such a manner that the shock sensing portions 661, 662, and 663 have fixing portions to fix the sixth detecting apparatus 56 inside a housing of an electronic appliance. Alternatively, these shock sensing portions 661, 662 and 663 are fixed on a thin film having a fixing portion to fix the sixth detecting apparatus 56 inside the housing of the electronic appliance.

The fixing potion is applied to any one of a double-sided adhesive tape, an adhesive capable of sticking together instantaneously, or an elastic adhesive with a high stripping strength.

The above-explained detecting apparatus 56 may be used as each of the detecting apparatuses mounted on the portable electronic appliance according to the first and second embodiments of the present invention shown in FIGS. 1 to 8.

Figure 15:
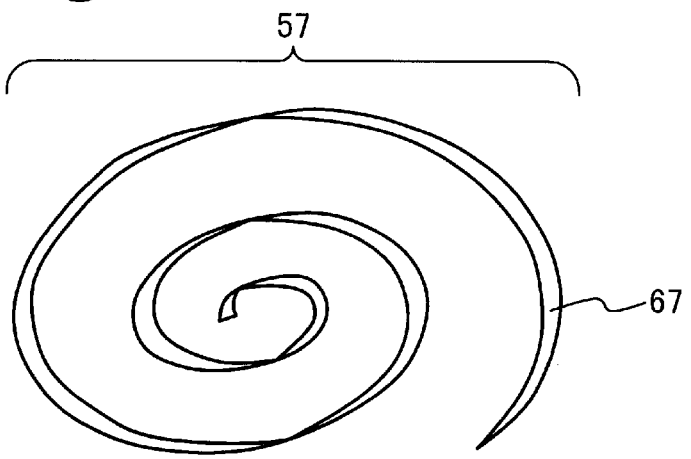
FIG. 15 schematically illustrates a structure of a detecting apparatus according to a seventh embodiment of the present invention.

FIG. 15 schematically illustrates a structure of a detecting apparatus 57 according to a seventh embodiment of the present invention.

The detecting apparatus 57 of the seventh embodiment includes a shock sensing portion 67 formed in a spiral shape. A widthness or a thickness of the shock sensing portion 67 is changed in a half way. These changed portions of the shock sensing portion 67 have threshold values different from each other. When a shock stronger than or equal to a strength is applied to each of these shock sensing portion, cracks are produced in ones of the changed portions. However the other of the changed portions are not damaged. As a consequence, the repair engineer can recognize a strength of a shock applied to the seventh detecting apparatus 57 by confirming the portion within the shock sensing portion 67, in which a crack is produced. On the other hand, the repair engineer can recognize that the larger the cracked portions are produced within the shock sensing portion 67, the stronger the strength of the applied shock is.

The detecting apparatus 57 may be constructed in such a manner that the shock sensing portion 67 includes a fixing portion to fix the detecting apparatus 57 inside a housing of an electronic appliance. Alternatively, the detecting apparatus 57 may have a structure that the shock sensing portion 67 is fixed on a thin film having a fixing portion to fix the detecting apparatus 57 inside a housing of an electronic appliance.

The fixing portion is applied to any one of a double-sided adhesive tape, an adhesive capable of sticking together instantaneously, or an elastic adhesive with a high stripping strength.

The above-explained detecting apparatus 57 may be used as each of the detecting apparatuses mounted on the portable electronic appliance according to the first and second embodiments of the present invention shown in FIGS. 1 to 8.

Figure 16:
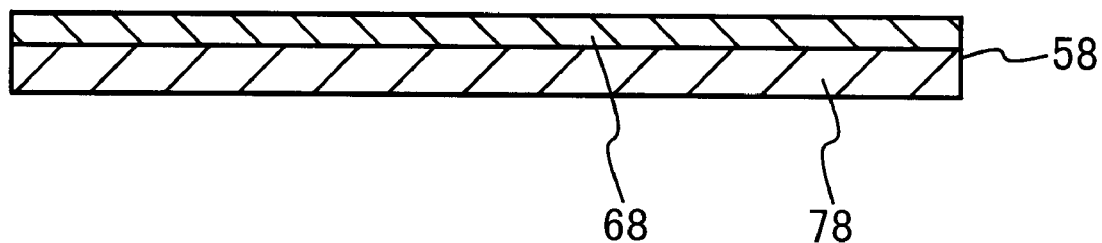
FIG. 16 schematically indicates a structure of a detecting apparatus according to an eighth embodiment of the present invention.

FIG. 16 schematically indicates a structure of a detecting apparatus 58 according to an eighth embodiment of the present invention.

The detecting apparatus 58 of the eighth embodiment is provided on a shock sensing portion 68. The shock sensing portion 68 is made of a material which is deformed by a shock having a strength higher than or equal to a preselected value. As an example, the sensing material is plasticity-deformed, and is gel-conditioned, or a metal having a ductile characteristic.

Also, the eighth detecting apparatus 58 owns an adhesive portion 78. The adhesive portion 78 has an adhesive characteristic. The detecting apparatus 58 is fixed to an inside of a housing of an electronic appliance with the adhesive portion 78. The adhesive portion 78 is applied to any one of a double-sided adhesive tape, an adhesive capable of sticking together instantaneously, or an elastic adhesive with a high stripping strength.

When a shock stronger than or equal to a pre-selected value is applied to the shock sensing portion 68, the shock sensing portion 68 is deformed. On the other hand, the shock sensing portion 68 is deformed in response to a strength of an applied shock. As a consequence, the repair engineer can recognize a strength of a shock applied to the eighth detecting apparatus 58 by checking the deformation amount and/or by checking whether or not the shock sensing portion 68 is deformed.

The above-explained detecting apparatus 58 may be used as each of the detecting apparatuses mounted on the portable electronic appliance according to the first and second embodiments of the present invention shown in FIGS. 1 to 8.

Figure 17:
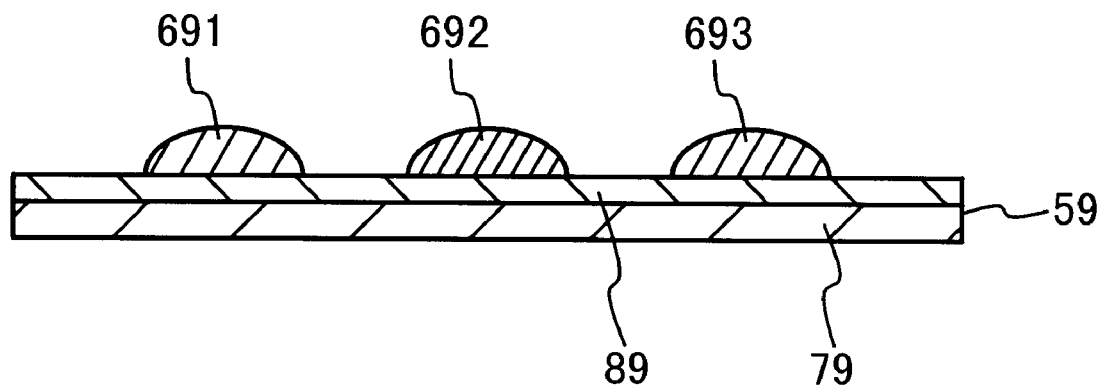
FIG. 17 schematically indicates a structure of a detecting apparatus according to a ninth embodiment of the present invention.

FIG. 17 schematically indicates a structure of a detecting apparatus 59 according to a ninth embodiment of the present invention.

The detecting apparatus 59 of the ninth embodiment is provided on a plurality of shock sensing portions 691, 692 and 693 on a thin plate 89. These shock sensing portions 691, 692 and 693 are made of a material which is deformed a shock having a strength higher than or equal to a preselected value. It is similar to the seventh modification of the first embodiment according to the present invention. The shock sensing portions 691, 692 and 693 are preferably arranged with a constant interval on the thin plate 89 each other.

Also, the ninth detecting apparatus 59 has an adhesive portion 79. The adhesive portion 79 has an adhesive characteristic. The detecting apparatus 59 is fixed to an inside of a housing of an electronic appliance with the adhesive portion 79. The adhesive portion 79 is applied to any one of a double-sided adhesive tape, an adhesive capable of sticking together instantaneously, or an elastic adhesive with a high stripping strength.

These shock sensing portions 691, 692 and 693 have threshold values different from each other. Moreover, these shock sensing portions 691, 692 and 693 have deformation values different from each other in response to a strength of an applied shock. When a shock stronger than or equal to a pre-selected value is applied to these shock sensing portions 691, 692 and 693, these shock sensing portions 691, 692 and 693 is deformed in response to the strength of the shock. As a result, when the shock having the same strength is applied, ones of the shock sensing portions 691, 692 and 693 may be deformed. Otherwise, the other of the shock sensing portions 691, 692 and 693 may not be deformed. Also, the deformation amounts in the ones of the shock sensing portions 691, 692, 693 are different from each other. As a consequence, the repair engineer can recognize a strength of a shock applied to the ninth detecting apparatus 59 by checking the deformed amount of the ones, and/or whether or not these shock sensing portions 691, 692. 693 are deformed.

Furthermore, a plurality of shock sensing portions 691, 692, 693 are composed of a plurality of detecting groups. Each of these detecting groups may include a pre-selected number of shock sensing portions which have equal deformed amount in response to the strength of the applied shock.

The above-explained detecting apparatus 59 may be used as each of the detecting apparatuses mounted on the portable electronic appliance according to the first and second embodiments of the present invention shown in FIGS. 1 to 8.

What is claimed is:

1. A portable electronic device comprising:

a shock detecting apparatus fitted inside the device, the shock detecting apparatus becoming damaged upon an application of an impact above a certain threshold value; and wherein said detecting apparatus comprises a plurality of layers separated by thin membranes, and different paints are enclosed within the plurality of layers.

2. A portable electronic device comprising:

a shock detecting apparatus fitted inside the device, the shock detecting apparatus becoming damaged upon an application of an impact above a certain threshold value; and wherein said detecting member has a plurality of detector components on a thin plate, and said plurality of detector components differ in at least their material or thickness so that they have mutually different aforementioned threshold values.

3. A portable electronic device comprising:

a shock detecting apparatus fitted inside the device, the shock detecting apparatus becoming damaged upon an application of an impact above a certain threshold value; and wherein said detecting apparatus has a plurality of detector components of different thicknesses formed in stages, and said detector components have mutually different aforementioned threshold values.

4. A portable electronic device comprising:

a shock detecting apparatus fitted inside the device, the shock detecting apparatus becoming damaged upon an application of an impact above a certain threshold value; and wherein said detecting apparatus has a plurality of detector components in the form of rings, and said detector components differ in at least either material or thickness and have mutually different aforementioned threshold values.

5. A portable electronic device comprising:

a shock detecting apparatus fitted inside the device, the shock detecting apparatus becoming damaged upon an application of an impact above a certain threshold value; and wherein said detecting apparatus is in the form of a coil in which there are changes in at least either depth or thickness, and each portion of differing width or depth has a different aforementioned threshold value.

6. A portable electronic device comprising:

a shock detecting apparatus fitted inside the device, the shock detecting apparatus becoming damaged upon an application of an impact above a certain threshold value; and wherein said detecting apparatus has a plurality of detector components of gel material which deform on impact, and said detector components differ in at least material or thickness and have mutually different aforementioned threshold values.

* * * * *